United States Patent
Penfornis et al.

(10) Patent No.: US 7,062,912 B2
(45) Date of Patent: Jun. 20, 2006

(54) INTEGRATED HEAT RECOVERY SYSTEMS AND METHODS FOR INCREASING THE EFFICIENCY OF AN OXYGEN-FIRED FURNACE

(75) Inventors: Erwin Penfornis, Oak Park, IL (US); Ovidiu Marin, Lisle, IL (US); Bertrand Leroux, Paris (FR); Remi P. Tsiava, Germain-les-Corbeil (FR)

(73) Assignees: American Air Liquide, Inc., Fremont, CA (US); L'Air Liquide, Societe Anonyme A Directoire et Consell de Surveillance Pour l'etude et l'Exploitation des Procedes Georges Claude, Paris (FR)

( * ) Notice: Subject to any disclaimer, the term of this patent is extended or adjusted under 35 U.S.C. 154(b) by 78 days.

(21) Appl. No.: 10/373,313

(22) Filed: Feb. 24, 2003

(65) Prior Publication Data

US 2003/0217704 A1    Nov. 27, 2003

Related U.S. Application Data

(60) Provisional application No. 60/359,512, filed on Feb. 25, 2002.

(51) Int. Cl.
*F01K 25/06* (2006.01)
(52) U.S. Cl. .............................. 60/649; 60/651; 60/671
(58) Field of Classification Search .................. 60/649, 60/670, 671, 651
See application file for complete search history.

(56) References Cited

U.S. PATENT DOCUMENTS

| | | | |
|---|---|---|---|
| 4,074,981 A | * | 2/1978 | Slater ........................ 48/197 R |
| 4,178,758 A | * | 12/1979 | Paull et al. .................... 60/648 |
| 4,362,129 A | | 12/1982 | Banfi et al. |
| 5,006,141 A | | 4/1991 | Chen et al. |

(Continued)

FOREIGN PATENT DOCUMENTS

EP           0924169 A2    12/1998

(Continued)

OTHER PUBLICATIONS

Article, International Journal Glass, Apr. 1998, "Process for Heat Recovery and Energy Savings in a (Oxy-Fired) Glass Furnace: A Technology Survey", Illy, Borders, Joshi, Zucchelli and Jurcik.

*Primary Examiner*—Hoang Nguyen
(74) *Attorney, Agent, or Firm*—Christopher J. Cronin (57) ABSTRACT

An air separation unit separates air into an oxygen-rich and oxygen-deficient gas. Fuel gas and the oxygen-rich gas are preheated at heat exchangers through which hot flue gas flows. Combustion of the preheated fuel and oxygen-rich gases result in the hot flue gas. The hot flue gas is cooled at the heat exchangers and flows through a waste heat boiler. Water and/or steam flowing through the waste heat boiler absorbs energy from the cooled flue gas thereby producing heated steam. The heated steam flows through a turbine to produce power. The power is transferred to the air separation unit, thus reducing a power requirement of the air separation unit needed to separate the air.

36 Claims, 7 Drawing Sheets

U.S. PATENT DOCUMENTS

| | | | |
|---|---|---|---|
| 5,175,993 A * | 1/1993 | Raiko et al. | 60/775 |
| 5,807,418 A | 9/1998 | Chamberland et al. | |
| 5,875,722 A * | 3/1999 | Gosselin et al. | 110/345 |
| 6,071,116 A | 6/2000 | Phillippe et al. | |
| 6,148,602 A | 11/2000 | Demetri | |
| 6,217,681 B1 | 4/2001 | Bazarian et al. | |
| 6,250,916 B1 | 6/2001 | Philippe et al. | |
| 6,282,901 B1 * | 9/2001 | Marin et al. | 60/649 |
| 6,382,958 B1 * | 5/2002 | Bool et al. | 431/2 |
| 6,568,185 B1 * | 5/2003 | Marin et al. | 60/649 |

FOREIGN PATENT DOCUMENTS

WO     WO 98/27017     6/1998

* cited by examiner

INTEGRATED HEAT RECOVERY SYSTEMS AND METHODS FOR INCREASING THE EFFICIENCY OF AN OXYGEN-FIRED FURNACE

CROSS-REFERENCE TO RELATED APPLICATIONS

This application claims priority under 35 U.S.C 119 (e) to U.S. provisional application No. 60/359,512 filed on Feb. 25, 2002, which is incorporated herein by reference.

BACKGROUND OF THE INVENTION

A. Field of the Invention

The invention is related to oxygen-fired furnaces. More particularly, the invention is related to methods and systems for increasing the efficiency of an oxygen-fired furnace.

B. Description of the Related Art

One important goal sought by those skilled in the combustion art is to increase the efficiency of the combustion process, such as by reducing capital costs, energy costs, fuel and oxidant costs, and operating costs. One method of doing so is through thermal energy recovery in furnaces. When implemented, it can often reduce energy and/or fuel requirements needed to operate the furnace. However, many of the various thermal energy techniques have their drawbacks. One of these drawbacks is financial. Capital and operating costs needed to implement the heat recovery technology must not outweigh the economic benefit of the heat recovery. Another of these drawbacks is related to safety, i.e., the technology must not create undue safety risks. Another of these drawbacks is technologically related. The designs, materials and controls must be adequate to put theoretical concepts into practice.

In air-fired furnaces, one approach for improving the furnaces' energy efficiency is by using the excess energy from the flue gas to preheat the combustion air using recuperators or regenerators. Recuperators transfer some of the heat from the flue gas to the combustion air in a heat exchanger, while regenerators accumulate some of the heat from the flue gas in a ceramic or refractory material for later preheating of the combustion air. Oxy-fired combustion has been questioned by many because of its supposedly high capital and operating costs related to oxygen production. While the above techniques have been successfully employed in some air-fired combustion furnaces, they would be relatively more difficult to apply to oxy-enriched combustion furnaces because of the hazards of handling the extremely reactive hot oxygen, thereby increasing the doubt about the financial soundness of oxy-fired combustion.

Cogeneration of power and heat by production of electricity and/or steam is another technique available to recover the thermal energy for uses other than recycling it back into the furnace. The disadvantage of this approach is that the capital costs often tend to be relatively high, thereby outweighing any economic benefits realized by this heat recovery strategy.

Another approach is thermochemical energy recovery, also known as fuel reforming. In fuel reforming, the heat content of a fuel is increased by reacting it with steam or carbon dioxide, or a mixture of the two in a reactor (reformer), to generate a combustible mixture of $H_2$ and CO that has a higher heat content than the initial fuel. Because this endothermic reforming reaction occurs at high temperatures (typically 900° C.), it beneficially utilizes the high temperature of the flue gases to provide the energy needed for the reforming reaction. However, this approach has its disadvantages. For many furnaces, the fuel consumption is not high enough to justify the high capital cost of installing a fuel reforming system. The complexity of the reformer and the safety constraints associated with handling hot $H_2$ and CO are additional drawbacks. If this technology were applied to oxy-fired furnaces, the complexity of the reformer would be multiplied because the energy available from the flue gas is typically not sufficient for reforming all of the fuel, thereby requiring an additional energy source in addition to the thermal energy of the flue gas.

The heat recovery methods used in conventional air-fired furnaces are often not readily applicable to oxy-fired (oxygen-enriched) combustion furnaces, because of process and handling difficulties. For example, flue gases from oxy-fired combustion are extremely high in water content (up to about 60%), and are at very high temperatures (1200° C. or higher). They may also contain high levels of particulates, condensable batch vapors, or condensed batch vapors, thereby making the flue gases quite corrosive.

At the same time, the flue gas must also be treated at a pollution abatement system in order to comply with the applicable environmental regulations. Since these pollution abatement systems, such as electrostatic precipitator or baghouses, can only be operated at a temperature of about 400° C. or below, it is necessary to cool this gas down beforehand.

Cooling the hot flue gas before treatment at the abatement system may be done by diluting the hot flue gas with ambient air. However, air dilution increases the amount of flue gas to be treated, thereby increasing the capitol and operating costs of the abatement system used to treat the cooled flue gas, and consequently, the size and complexity of the pollution abatement equipment system increases. The capital and operating expenses also go up as well.

Cooling the hot flue gas before treatment at the abatement system may be done by spraying it with water. However, water spraying increases the dew point of the flue gas, thereby increasing the risk of corrosive gas condensation in the abatement systems or in the exhaust duct. If this technology were to be implemented in an oxy-fired furnace, this problem would likely be magnified because the water content of the flue gas can be as high as about 60% by volume.

Thus, those skilled in the art will recognize there is a need for an improved process and system for increasing the efficiency of oxygen-enriched combustion systems through heat recovery. They will also recognize there is a need for such an improved method and system that integrates a variety of heat recovery strategies. They will further recognize there is a need for such an improved method and system that will decrease oxygen and/or fuel requirements. They will further recognize that there is a need for such a method and system that will reduce a power requirement needed for oxygen production. They will further recognize that there is a need for such a method and system that will reduce the size of pollution abatement systems needed for treating pollution contained in flue gases. They will further recognize that there is a need for such a method and system that will allow safe recovery of thermal energy. They will still further recognize that there is a need for such a method and system that will reduce capital and operating costs. Finally, they will recognize that there is a need for an integrated method and system that satisfies all of these needs.

BRIEF SUMMARY OF THE INVENTION

It is therefore a primary object of the invention to provide systems and methods of that meet these and other needs. It is a second object of the invention to provide systems and methods that will reduce oxygen and/or fuel requirements. It is a third object of the invention to provide systems and methods that will reduce a power requirement needed for oxygen production. It is a fourth object of the invention to provide systems and methods that will reduce the size of a pollution abatement system needed for treating pollution contained in flue gases. It is a fifth object to provide systems and methods that will allow safe recovery of thermal energy. It is a sixth object of the invention to provide systems and methods that will reduce capital and operating costs. It is a seventh object of the invention to provide a integrated systems and integrated methods that will achieve all of these objects.

Accordingly, a system is provided for recovering thermal energy produced by an oxygen-enriched combustion furnace in which oxidant and fuel gases are combusted thereby producing flue gas. The system includes a source of oxidant gas, at least one heat exchanger system, a waste heat boiler, and a turbine. The oxidant gas has a higher oxygen content than air. The at least one heat exchanger system is adapted to receive the flue gas and at least one of the oxidant gas and the fuel gas, such that the at least one of the oxidant gas and the fuel gas are heated and the flue gas is cooled. The waste heat boiler is adapted to transfer heat from the flue gas to feedwater flowing therethrough to produce superheated steam. Expansion of the superheated steam through the turbine produces mechanical power.

A method is provided for increasing the energy efficiency of an oxygen-enriched combustion furnace. The method includes the following steps. Oxidant gas and fuel gas are provided, wherein the oxidant gas has an oxygen content higher than air. At least one of the oxidant and fuel gases is allowed to flow through at least one heat exchanger system thereby heating at least one of the oxidant and fuel gases. The heated oxidant and fuel gases are combusted in the furnace thereby providing flue gas. The flue gas is allowed to flow through the at least one heat exchanger system thereby cooling the flue gas as the oxidant and fuel gases are heated. The feedwater and the flue gas are allowed to flow through a waste heat boiler such that heat from the flue gas is transferred to the feedwater thereby producing superheated steam. The superheated steam is allowed to be expanded through a turbine thereby producing mechanical power.

DETAILED DESCRIPTION OF THE INVENTION

A system of the invention is for increasing the efficiency of oxygen-enriched combustion in industrial furnaces through integrated heat recovery strategies in which oxidant and fuel gases are combusted thereby producing flue gas. The system includes a source of oxygen-enriched gas, at least one heat exchanger system, a waste heat boiler and a turbine. The oxygen-enriched gas has an oxygen level higher than that of air. The heat exchanger(s) absorbs thermal energy from the flue gas and transfers it to at least one of the oxidant and fuel gases. The waste heat boiler also absorbs thermal energy from the flue gas and transfers it to feed water to produce superheated steam. The turbine produces mechanical power by allowing the superheated steam to be expanded therethrough.

A method of the invention is for increasing the efficiency of an oxygen-enriched combustion furnace in which oxidant and fuel gases are combusted such that flue gas is produced. The method includes the following steps. Oxidant gas and fuel gas are provided, wherein the oxidant gas having an oxygen content higher than air. The flue gas and at least one of the oxidant and fuel gases is allowed to flow through at least one heat exchanger system thereby heating at least one of the oxidant and fuel gases, and cooling the flue gas. The heated oxidant and fuel gases are combusted in the furnace thereby providing the flue gas. Feedwater and the flue gas are allowed to flow through a waste heat boiler such that heat from the flue gas is transferred to the feedwater thereby producing superheated steam. The superheated steam is expanded through a steam turbine thereby producing mechanical power.

Although the invention is particularly applicable to a glass melting facility, and more particularly to a float glass process, the invention is not limited to such an application. Rather, the invention is generally applicable to any oxygen-fired industrial furnace, whether equipped with on-site production of oxygen or not, wherein a temperature of flue gas generated by the furnace is high enough to allow efficient heat recovery.

Figure 1:
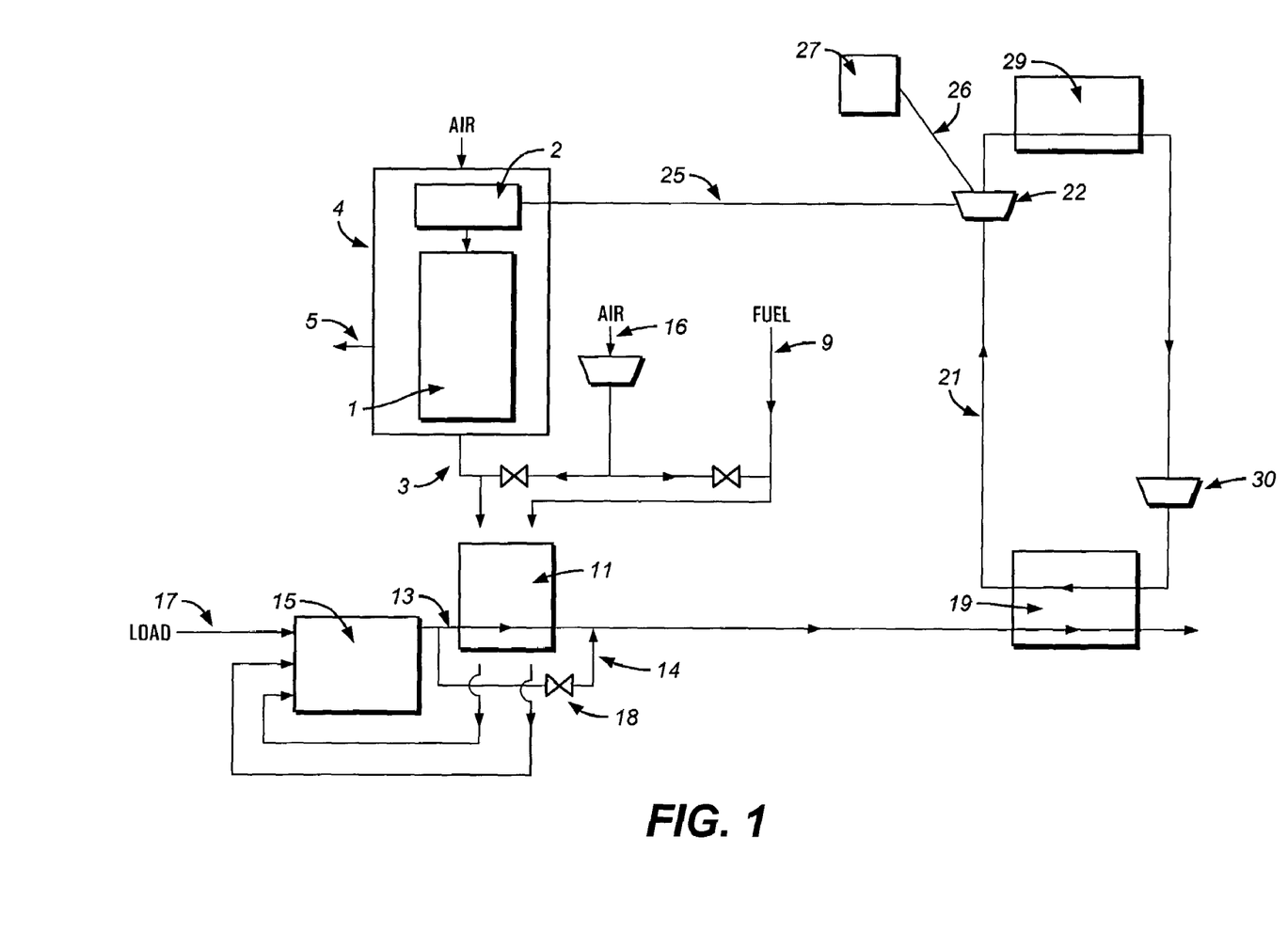
FIG. 1 is a schematic view of a first embodiment of the system of the invention including at least one heat exchanger, wherein thermal energy of the flue gas is heat exchanged with at least one of the fuel and oxidant gases and then heat exchanged with water and steam in the waste heat boiler in that order.

As best shown in FIG. 1, a first preferred embodiment includes an air separation system 4 in which a source of air is compressed by a compressor 2 and separated by an air separation unit (ASU) 1 into a flow of oxidant gas 3 having an oxygen level higher than that of air and a flow of oxygen-deficient gas 5 having an oxygen level lower than that of air. The ASU 1 may utilize various air separation systems, including but not limited to, a cryogenic system, a membrane system, or an adsorptive PSA or VSA. Typically, depending on the particular air separation process chosen, the oxidant gas 3 contains at least 21% of oxygen (by volume) and preferably at least 90% of oxygen.

The flow of oxidant gas 3 and a flow of fuel gas 9 are directed towards heat exchanger system 11. Examples of fuel gas include, but are not limited to, natural gas, other gaseous hydrocarbons, and mixtures thereof. At heat exchanger system 11, either one or both of the flows of oxidant and fuel gases 3, 9 are preheated by heat exchange with a flow of flue gas 13 exiting a furnace 15 to a temperature that allows safe operation of the heat exchanger. Following the heat exchanger system 11, the flows of oxidant and fuel are directed towards the furnace 15 where they are combusted. Preheating of at least one of the oxidant and fuel gas flows 3, 9 raises the amount of thermal energy introduced into the furnace 15. As a result, lesser amounts of oxidant and fuel gases may be combusted to reach an energy input to the furnace 15 and a heat input to load 17 than would otherwise be achievable in absence of preheating through heat exchange with the flue gas.

As illustrated in FIG. 1, the flows of oxidant gas 3 and/or fuel gas 9 are preheated at heat exchanger system 11, while the flow of flue gas 13 entering heat exchanger system 11 is correspondingly cooled from a temperature usually above 1,200° C. The flows of oxidant and fuel gases 3, 9 can be heated to a temperature of from about 200° C. to about 800° C., more preferably from about 200° C. to about 600° C., and most preferably from about 450° C. to about 550° C. On the other hand, the flow of flue gas 13 is typically cooled to a temperature from about 500° C. to about 1500° C., and preferably to a temperature greater than 1000° C. Optionally, a cold air circuit 16 may be connected to oxidant and/or fuel gas flows 3, 9, upstream of the heat exchanger system system 11 and an emergency switch may be operated to provide cooling air in case of interruption of oxidant or fuel supply, thus avoiding the failure of the heat exchanger system 11 and/or a possible accident. Also optionally, part or all of the flow of flue gas 13 may be selectively diverted around heat exchanger system 11 via bypass circuit 14, thereby adjusting the relative degree of preheating of the flows of oxidant and/or fuel gas 3, 9, and/or avoiding overheating of heat exchanger system 11. This is accomplished by adjusting variable flow valve 18, thus allowing more, less, or none of the flue gas flow 13 to bypass the heat exchanger system 11.

Downstream of heat exchanger system 11, the flows of oxidant and fuel gases 3, 9 are injected into the furnace 15, where they are combusted to generate hot combustion products. In the case of a glass melting facility, hot combustion products provide heat for melting or reheating of the load 17 introduced in the furnace 15. The hot combustion products are exhausted from the furnace to provide the flow of flue gas 13. A temperature of the flow of flue gas 13 may be extremely high. In practice of the invention, the temperature of the flue gas flow 13 can reach higher than about 1,200° C., or even higher than 1,216° C. or up to about 1,600° C.

As shown in FIG. 1, the flue gas flow 13 passes through heat exchanger system 11 where heat is partially transferred from it to the flows of oxidant and fuel gases 3, 9. Flue gas flow 13 then flows through a waste heat boiler 19 where heat is partially transferred from it to feed water flowing through waste heat boiler 19 thereby producing a flow of pressurized, superheated steam 21. Superheated steam 21 is then expanded through a steam turbine 22 to produce mechanical power. Mechanical power produced by steam turbine 22 is used either to generate shaft power via shaft 25 and/or electrical power via generator 27. Either one or both of the mechanical and electrical power produced by steam turbine 22 may be used to supply power for other portions of the process or for other processes. Preferably, the mechanical power is used to drive compressor 2, thereby reducing a power consumption of the air separation system 4 realized in separating air.

Steam 21 exits the turbine 22 at about 100 mbar and is condensed at condenser 29 and pressurized in a pump 30 before being fed to the waste of flue gas flow 13 exiting the boiler is low enough to allow it to pass through at least one pollution abatement system, such as a baghouse filter, an ESP or a scrubber, in order to keep all emissions within permitted levels, before being sent to the stack.

Many different configurations and sequences of the invention may be performed.

Figure 2:
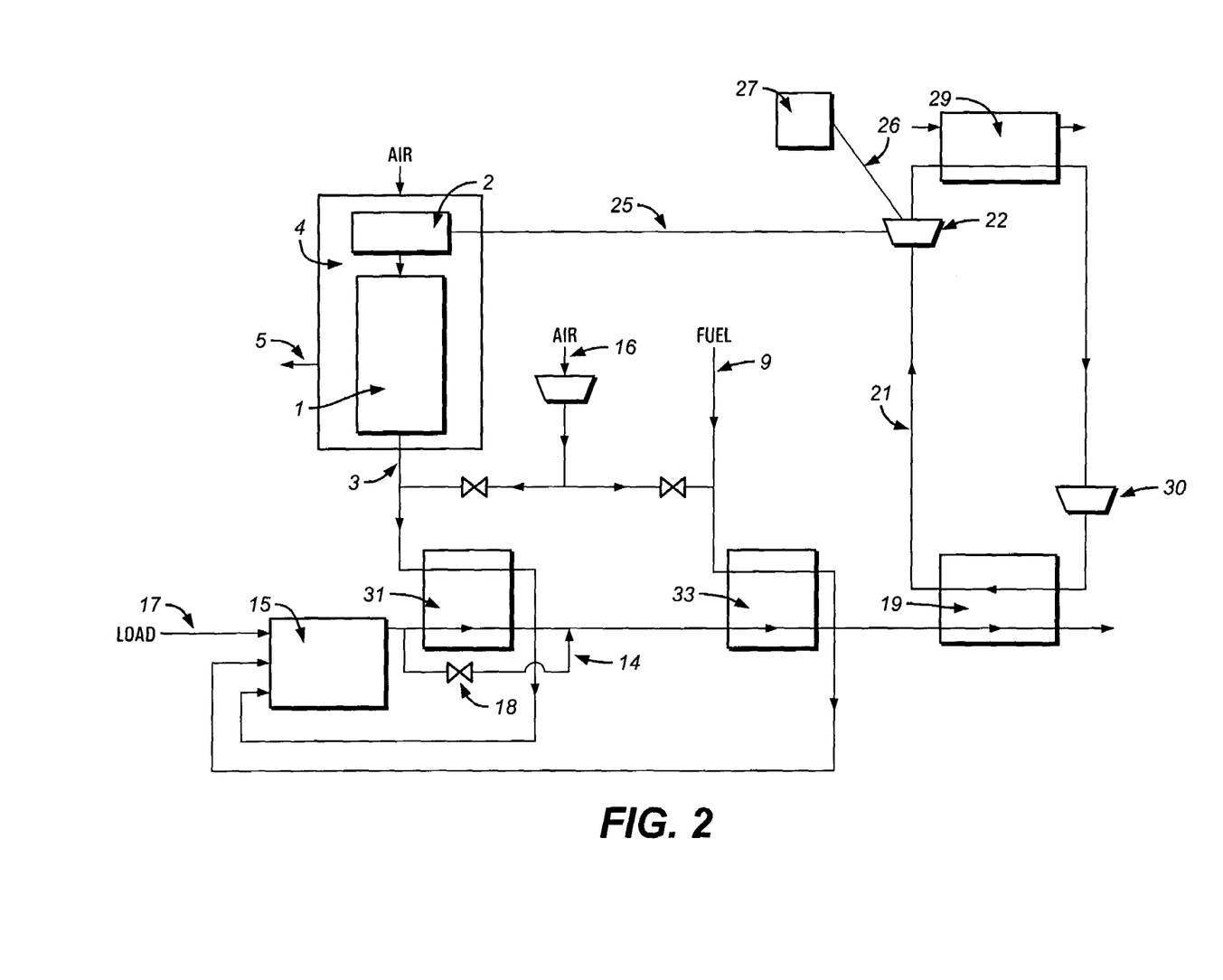
FIG. 2 is a schematic view of a second embodiment of the system of the invention including two heat exchangers for preheating the oxidant and fuel gases in that order.

For instance, as best shown in FIG. 2, a most preferred embodiment includes two heat exchanger systems 31 and 33 for preheating the flows of oxidant and fuel gases 3, 9, respectively. The use of heat exchange for preheating one or both of the flows of oxidant and fuel gases 3, 9 is an important aspect of the invention. Preheating significantly reduces the oxidant and fuel consumption of the furnace, since part of the energy input required in the furnace is brought in the form of sensible heat instead of combustible power. Because of this potential energy saving, it is especially advantageous when both the oxidant and fuel gas flows 3, 9 are preheated, in order to bring even more sensible heat in the furnace. For example, in order to reach a selected level of load throughput, it is possible to reduce safely the flow rate of the oxidant and fuel gases by up to 10% if they are preheated in comparison to operation of the furnace 15 without preheating. This embodiment may also be modified such that flue gas flow 13 passes first through heat exchanger 31, second through waste heat boiler 19, and third through heat exchanger 33.

Figure 3:
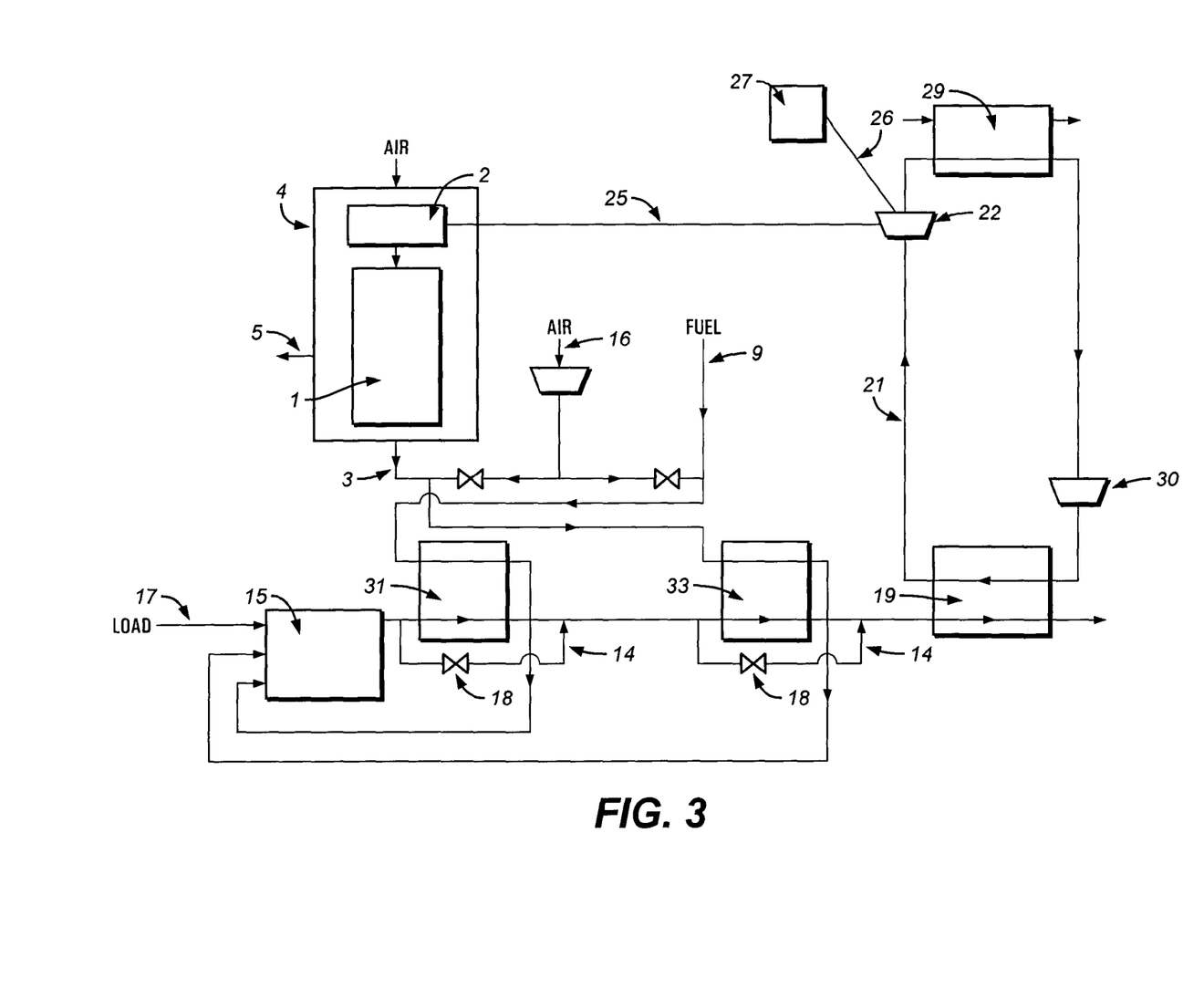
FIG. 3 is a schematic view of a third embodiment of the system of the invention including two heat exchangers for preheating the fuel and oxidant gases in that order.

As best illustrated in FIG. 3, another preferred embodiment also includes two heat exchanger systems 31 and 33. In this embodiment, the flow of flue gas 13 passes first through heat exchanger system 31 to preheat the flow of fuel gas 9, and then second through heat exchanger system 33 to preheat the flow of oxidant gas 3. Similar to the embodiment depicted in FIG. 2, this embodiment may also be modified. For example, flue gas flow 13 may be allowed to pass first through heat exchanger system 31, second through waste heat boiler 19, and third through heat exchanger system 33.

Figure 4:
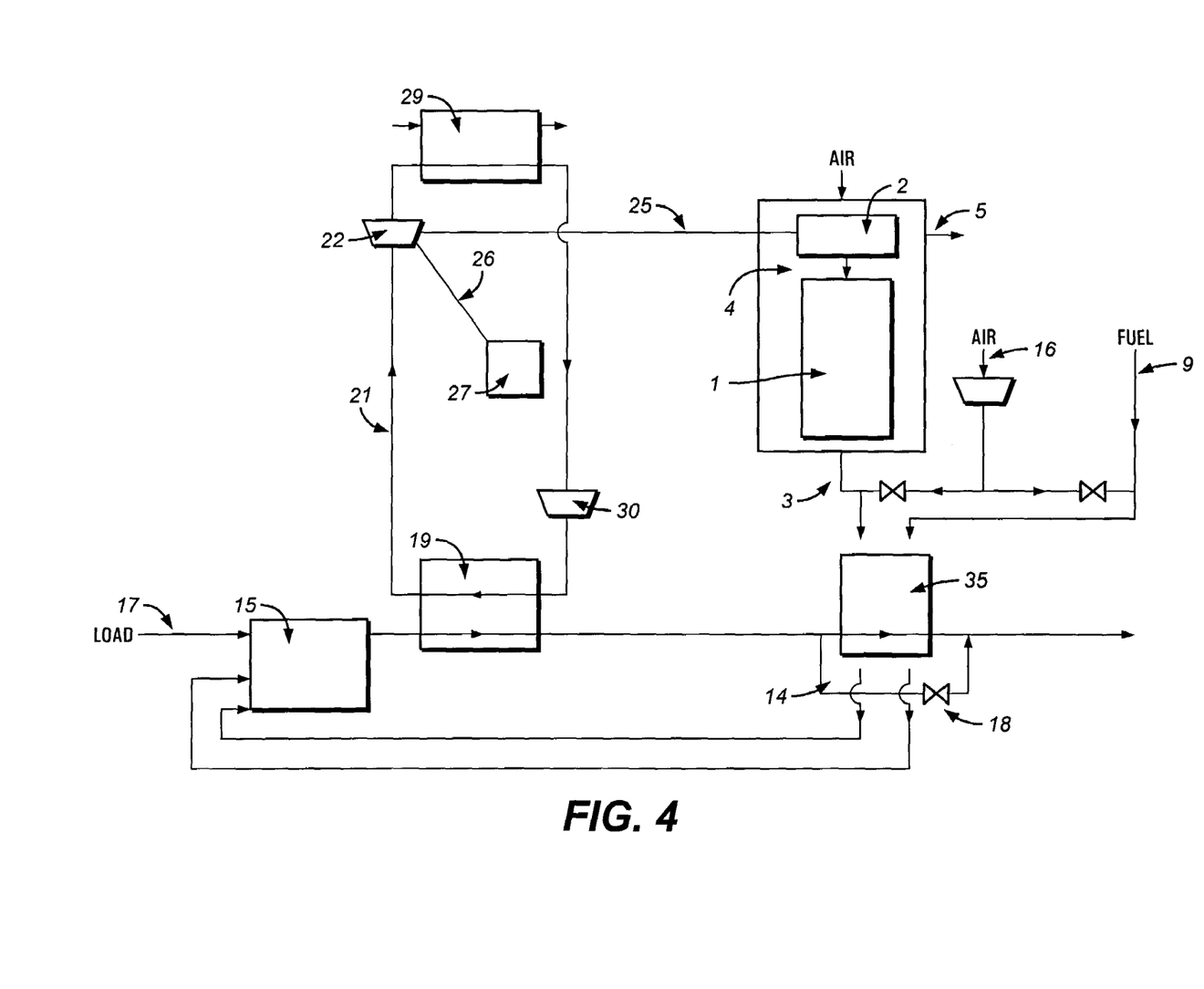
FIG. 4 is a schematic view of a fourth embodiment of the system of the invention including at least one heat exchanger wherein thermal energy of the flue gas is heat exchanged with water and steam in the waste heat boiler and then heat exchanged with at least one of the fuel and oxidant gases in that order.

As best shown in FIG. 4, another preferred embodiment includes at least one heat exchanger system 35 for preheating at least one of the flows of oxidant and fuel gases 3, 9. In this embodiment, the flow of flue gas 13 passes first through waste heat boiler, and then second through heat exchanger system 35. When a configuration including one heat exchanger for each of the flows of oxidant and fuel gases 3, 9 is chosen, the waste heat boiler 19 may be downstream of one of them and upstream of the other with respect to the flow of flue gas 13.

Figure 5:
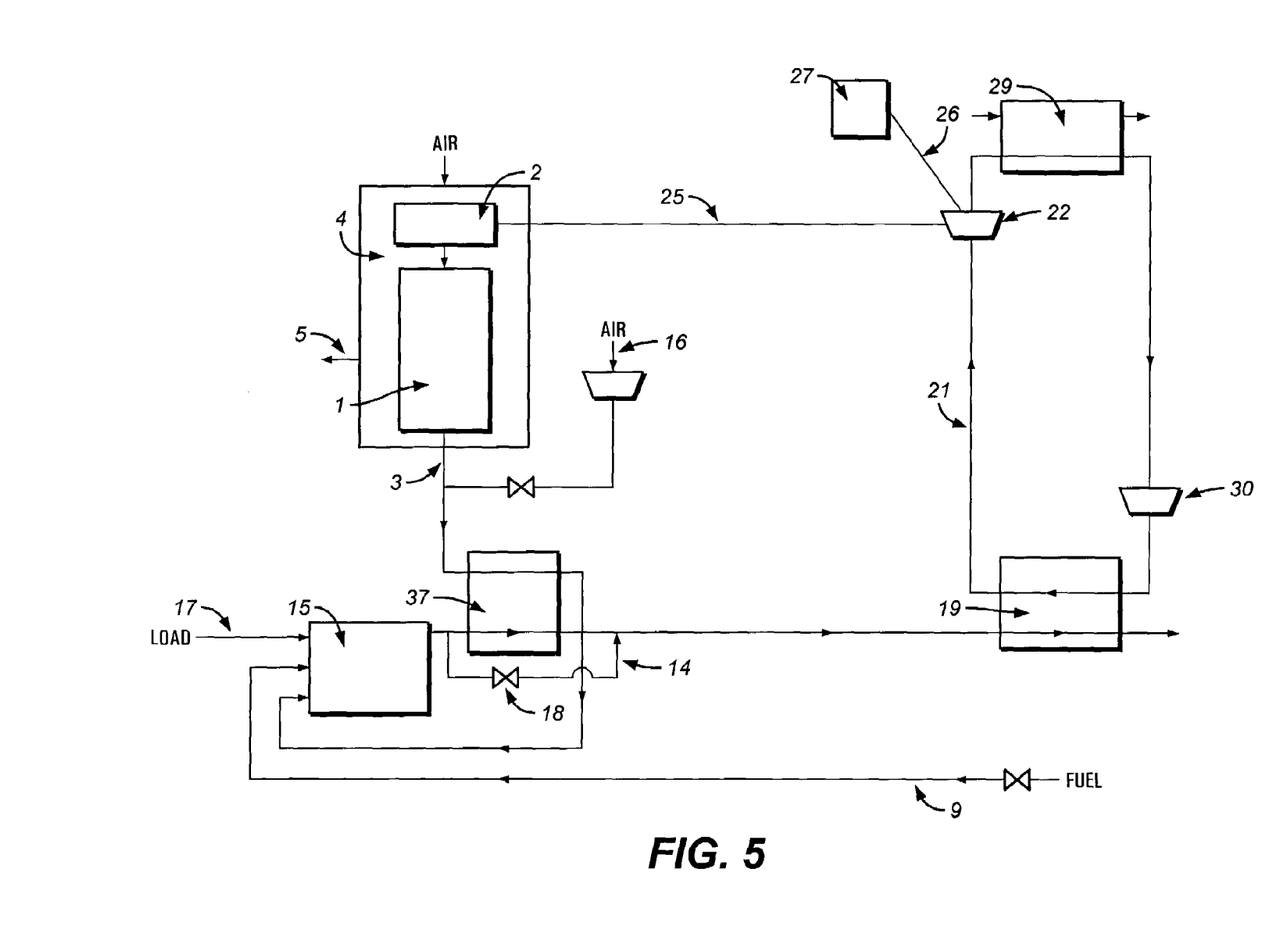
FIG. 5 is a schematic view of a fifth embodiment of the system of the invention including one heat exchanger wherein thermal energy of the flue gas is heat exchanged with the oxidant gas and then heat exchanged with water and/or steam in the waste heat boiler in that order.

As best illustrated in FIG. 5, another preferred embodiment includes only one heat exchanger system 37. In contrast to the embodiment depicted in FIG. 2, while in this embodiment the flow of oxidant gas 3 is preheated, the flow of fuel gas 9 is not. This embodiment may also be modified such that flue gas flow 13 first passes through waste heat boiler 19 and then through heat exchanger system 37.

Figure 6:
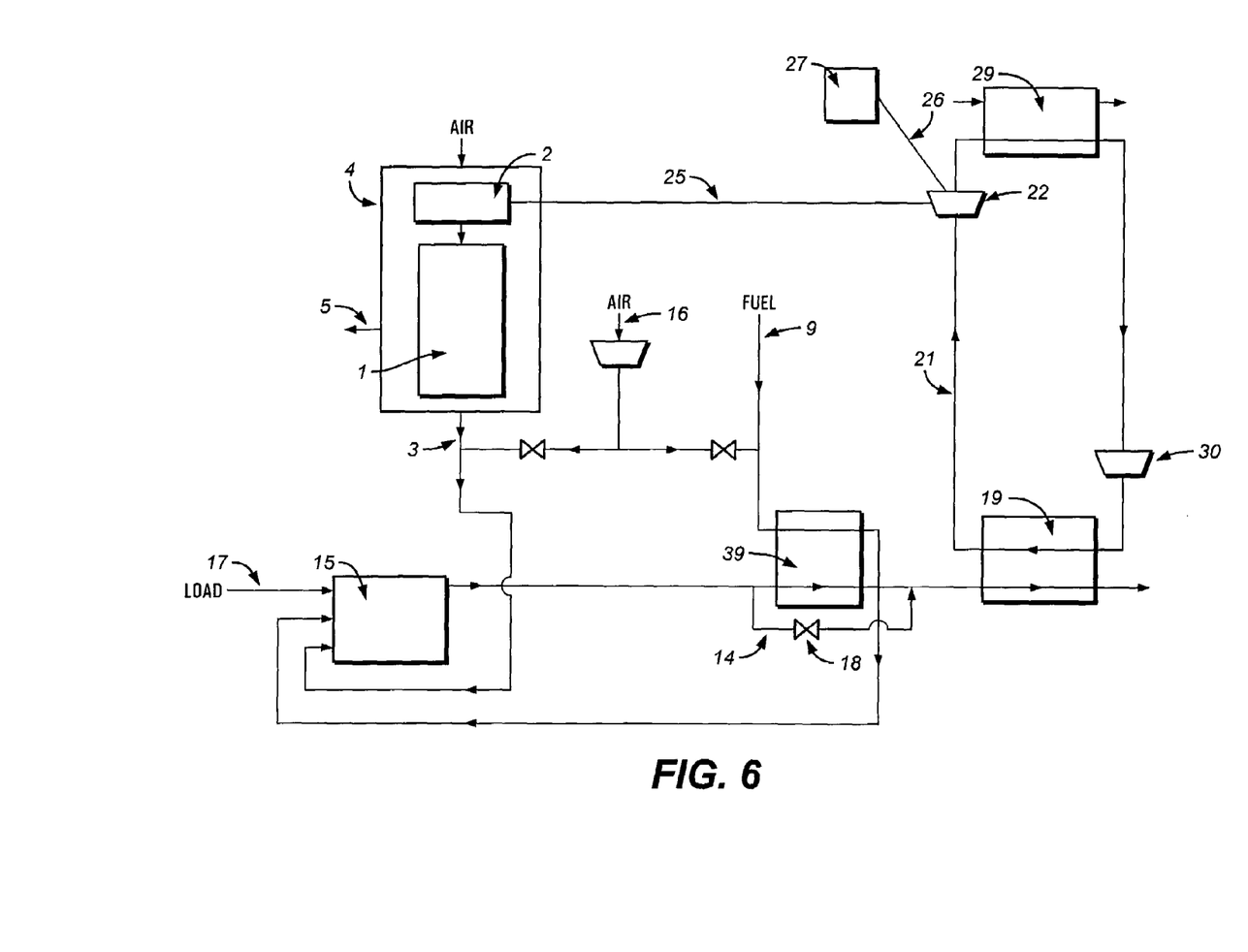
FIG. 6 is a schematic view of a sixth embodiment of the system of the invention including one heat exchanger wherein thermal energy of the flue gas is heat exchanged with the fuel gas and then heat exchanged with water and/or steam in the waste heat boiler in that order.

As best shown in FIG. 6, another preferred embodiment includes only one heat exchanger system 39. In this embodiment, while the flow of fuel gas 9 is preheated, the flow of oxidant gas 3 is not. This embodiment may also be modified such that flue gas flow 13 first passes through waste heat boiler 19 and then through heat exchanger system 39.

Figure 7:
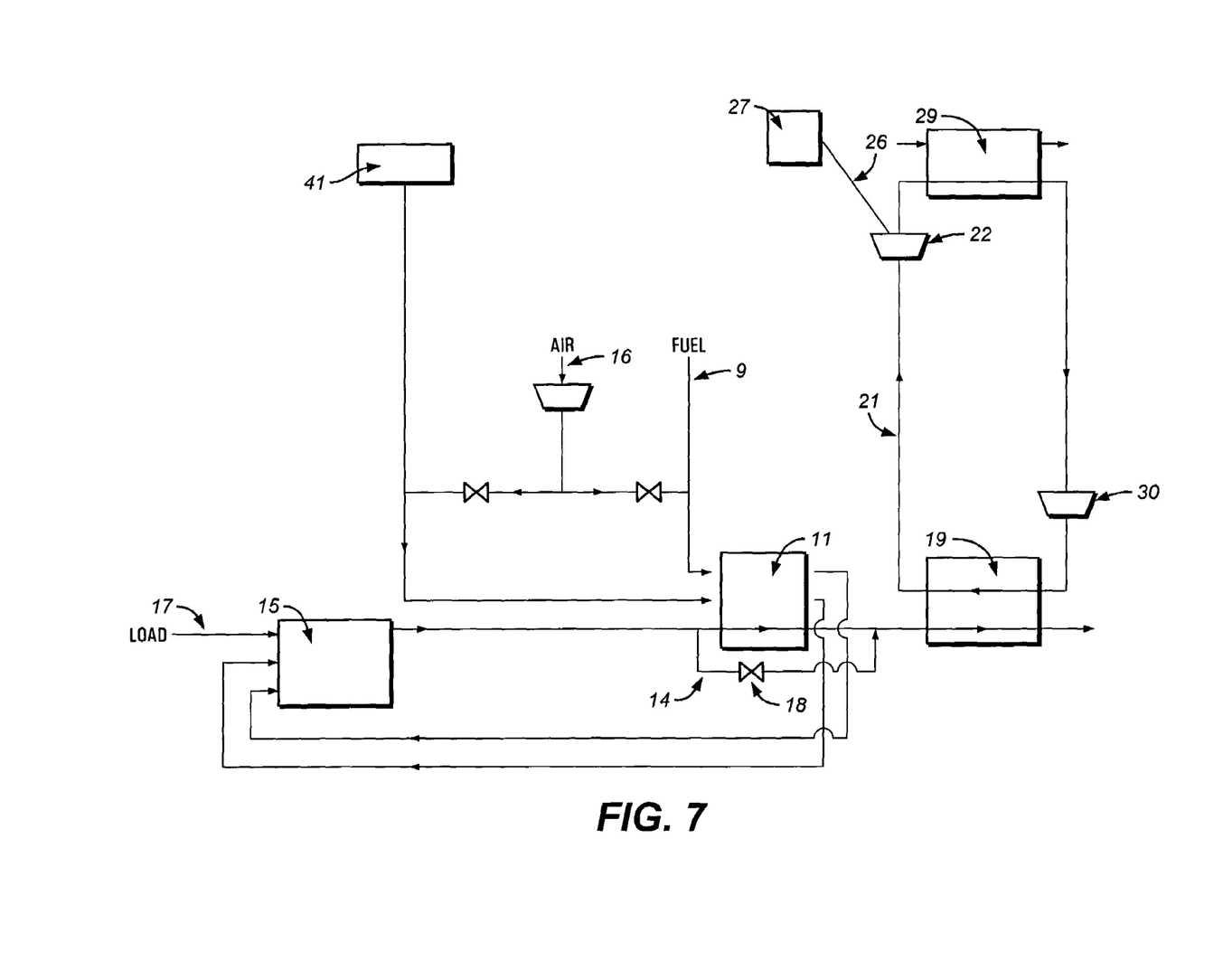
FIG. 7 is a schematic view of a seventh embodiment of the system of the invention wherein oxygen is remotely supplied to the system and all mechanical power produced by the steam turbine is transmitted to an electrical generator for producing electric power.

As best shown in FIG. 7, another preferred embodiment includes a source of oxidant gas 41 supplying the flow of oxidant gas 3. The source of oxidant gas 41 may be a pipeline from a remote oxygen production system. In this embodiment, all the mechanical power produced by steam turbine 22 is transferred to electrical generator 27 via shaft 26 for production of electric power. The electrical power may be used in other parts of the system or in other systems.

Because heat exchanger systems 11, 31, 33, 35, 37 and 39 may be exposed to flue gas at a temperature of up to 1,500° C., they are preferably be made of a material that can withstand a surface temperature of up to about 950° C. It is also preferable that heat exchanger systems 11, 31, 33, 35, 37 and 39 be made of materials that substantially resist corrosion under exposure to substantially pure oxygen at a temperature of 700° C. This is defined as a thickness depletion or accretion of no more than 800 nm/day under exposure of the material to substantially pure oxygen under atmospheric pressure having a temperature of about 700° C. A suitable test for measuring this corrosion resistance is as follows.

Materials tested include SS 304, SS 310, SS 446, Inconel 600, Inconel 625, Incoloy 800, and Incoloy 825. Two tubes of each material were obtained, thereby comprising first and second sets of tubes. Each of these tubes had an outer diameter of 2.13 cm, a wall thickness of 0.28 cm and a length of 2.54 cm. Each of the internal and external surfaces of the samples were prepared by grinding/abrading them with a 240-grit paper, washing them with soapy water, drying them, and cleaning them with two solvents (first by acetone and then by Vertrer MCA for hot oxygen service).

The second and third sets of samples were then placed in a furnace monitored to achieve a sample surface temperature of 700° C., equivalent to the surrounding oxygen temperature. Oxygen at atmospheric pressure was allowed to flow through the furnace at a rate of about 0.25–0.50 liters per minute. After 500 hours, each of the heated samples were removed from the furnace and weighed. The third set of samples were then returned to the furnace for an additional 500 hours of exposure for a total of 1,000 hours, and then weighed again. Based on the surface area of the samples and the density of each of the materials, the thickness depletions (or accretions) in nm/day at each time interval of 500 and 1,000 hours were calculated from the weight gains (or losses). Results of the testing are found in Table I.

TABLE 1

Depletion (Accretion) Rates

| Alloy | 304 | 310 | 446 | 600 | 625 | 800 | 825 |
|---|---|---|---|---|---|---|---|
| Density (g/cm$^3$) | 7.82 | 7.87 | 7.65 | 8.47 | 8.44 | 7.94 | 8.14 |
| nm/day at 500 hr (1$^{st}$ set) | (17670) | 996 | 1,086 | 723 | 895 | 708 | 300 |
| nm/day at 500 hr (2$^{nd}$ set) | not perf'd | 1,590 | 1,281 | 465 | 490 | 766 | 330 |
| nm/day at 1,000 hr | (11720) | 815 | 727 | 395 | 240 | 380 | 385 |

As seen in Table I, non-limiting examples of materials showing substantial resistance to corrosion at a surface temperature of 700° C. include Inconel 600 and Incoloy 800. These materials exhibited very little spallation. Their fully austenitic structure, good passivation properties and wide availability make them especially fit for this application. While Inconel 625 tended to exhibit good corrosion resistance over a 1,000 hour exposure, it at least initially appeared to deplete too much in comparison to the Inconel 600 and Incoloy 800.

For surfaces of the heat exchangers directly exposed to hot oxygen, the use of a coating would be beneficial to delay the corrosion phenomenon and increase the lifetime of the device. Aluminide/silicide coatings may be used to significantly reinforce the resistance of the alloys tested above. However, the invention is not restricted to use of these alloys and/or coatings. Other materials and coatings may also be suitable, especially if they exhibit results similar to those shown by Inconel 600 and Incoloy 800 in the testing scheme described above.

The heat exchanger systems 11, 31, 33, 35, 37 and 39 may include direct heat exchangers or indirect heat exchangers.

Direct heat exchangers are preferably designed to operate in a co-current configuration. In this configuration, the flue gas and cold fluids (oxidant gas or fuel gas) flow in the same direction along opposite sides of a heat transfer surface. The cold fluid absorbs heat from the flue gas through the heat transfer surface, while in effect acting as a cooling medium for the metal and helping to minimize hotspots. However, many different designs, such as counter-current and cross-flow, could also be used with the invention.

Indirect heat exchangers utilize an intermediate heat transfer fluid, such as air, to transfer heat from the flow of the flue gas 13 to the flow of the cold fluid (oxidant or fuel). Particularly preferred indirect heat exchangers are disclosed in U.S. Pat. Nos. 6,071,116 and 6,250,916, the contents of which are incorporated herein by reference.

One suitable design for a direct heat exchanger includes a tubular cage-type radiation recuperator, wherein one external pipe concentrically surrounds another internal pipe. Use of this design results in a pressure drop of the flow of oxidant gas 3 across the heat exchanger associated with the flow of oxidant gas 3 of only about 0.05 bar. Another suitable design for a heat exchanger includes a shell & tube design.

Unexpectedly, when suitable materials and designs are chosen for the heat exchanger systems 11, 31, 33, 35, 37 and 39, we have found that the flows of oxidant and/or fuel gases 3, 9 may be heated safely and cost-effectively to temperatures of from about 200° C. to about 800° C., more preferably from about 200° C. to about 600° C., and most preferably from about 450° C. to about 550° C. Also, the flow of flue gas 13 may be correspondingly cooled to a temperature of from about 500° C. to about 1500° C. by heat exchange. To our knowledge, previous attempts to preheat oxygen-enriched gases in furnaces through heat exchange with a hot flue gas have not led to any successful conclusions, because of either safety uncertainties or cost issues.

After heat exchange with the flows of oxidant and/or fuel gases 3, 9, the flow of flue gas 13 may still have a temperature as high as 1,500° C., preferably between 1200° C. and 1500° C., when it enters the waste heat boiler 19. Since this temperature is so high, the boiler 19 is preferably designed to robustly withstand relatively high temperatures.

One such design includes a convective economizer section, a convective evaporator section, and a superheater section through which the flue gas flows on one side of tubes surface(s), while water, steam and superheated steam flows on the opposite side. Feed water from pump 30 is preheated at the economizer section and fed to the convective evaporator section. Preferably, the feed water has a temperature of about 105° C. at a pressure of about 30 bar and is fed to the boiler 19, while the flow of flue gas 13 enters the boiler 19.

At the convective evaporator section, the water is turned to steam and separated therefrom by a steam drum. The resultant steam is heated to superheated temperatures, for example, 250° C. or higher, at the superheater section. Preferably, the superheated steam has a temperature of about 430° C. Each of the three sections in boiler 19 utilizes bare tubes to prevent excessive crevice fouling. Air-blown sootblowers may also be included to provide on-line cleaning of the heat transfer surface, should fouling occur due to particulate accumulation.

The above waste heat boiler 19 design also includes a flue gas recirculation system therein so that flue gas downstream of an entry of the boiler 19 is diluted and cooled with a portion of cooled flue gas from upstream of an exit of the boiler 19. If the invention is implemented at a glass melting facility, after dilution just downstream of the entry of the boiler 19, the flue gas is preferably cooled to a temperature of about 550° C. This ensures that all glass particulate is fully solidified before entering the convective heat transfer section. The flue gas recirculation system consists of a recirculation fan just upstream of the outlet of boiler 19, and gas ductwork to direct the recycle flue gas to a mixing chamber just downstream of the inlet of boiler 19.

Another suitable design for waste heat boiler 19 may be obtained from Heye-Glas in Germany. In this design, the flow of flue gas 13 is not diluted after entry into the boiler 19. Also, heat transfer surfaces in this boiler are cleaned through "shot cleaning", wherein steel balls are rained from the top of the boiler to jar any particulate accumulation loose. Additionally, when the invention is implemented at a glass melting facility, this design allows a built up layer of condensed flue gas components, such as sodium sulfate, upon heating surfaces. After a few days of operation, the layer buildup and the "shot cleaning" reach an equilibrium state wherein the built-up layer maintains its thickness. The insulative effect of the built-up layer prevents the flue gas from condensing upon heat transfer surfaces within the boiler 19.

Whichever design is chosen, the exit temperature of the flue gas should be maintained between 1 50° C. and 400° C., so that heat transfer to the steam is maximized, while keeping the flue gas temperature above its dew point in order to avoid condensation of corrosive flue gas.

A suitable steam turbine 23 may be obtained from a manufacturer such as Elliott Company, Dresser-Rand, or Murray. In one configuration, the steam turbine 22 is adapted to drive the compressor 2 in the air separation system 4 through a shaft 25, in order to reduce a power consumption of the air separation system 4 (e.g., that of the air compressor 2) needed to separate air into the flows of oxidant and oxygen-deficient gases 3, 5. In another configuration, the steam turbine 22 instead supplies mechanical power to the electrical generator 27 for generating electrical power for use in other portions of the system or in other systems.

The variable, yet integrated nature of the present invention allows tremendous flexibility in fuel and power savings. By adjusting the valve 18, the amount of flue gas flowing through the bypass circuit 14 may be varied, thus selectively allowing more or less heat transfer between the flue gas and oxidant and/or fuel gases and between the flue gas and the feedwater. In this manner, fuel costs and/or power costs may be minimized. When fuel costs are more important than power costs, valve 18 is actuated such the flows of oxidant and fuel gases 3, 9 are preheated to temperatures of up to 550° C., thereby maximizing fuel and oxidant savings (up to 10%). On the other hand, when power costs are more important, the valve 18 is adjusted such that relatively less heat transfer occurs between the flue gas and oxidant and/or fuel gases, while relatively more heat is recovered at the waste heat boiler 19.

When the steam turbine 22 is coupled to the air separation system 4, startling reductions in the power required by the air separation system 4 needed for separation of air into flows of oxidant gas 3 and oxygen-deficient gas 5 may be accomplished. We have unexpectedly found that up to 100% of the above-described power requirement may be accomplished. Preferably, at least about 50%, more preferably at least about 67%, even more preferably at least about 79%, and most preferably at least about 85% of power reduction may be achieved. These surprising results show that the energy costs of implementing oxy-fired combustion are significantly reduced in comparison to conventional air-fired combustion without implementation of oxy-fired combustion.

For a 600 ton/day glass melting facility, the following non-limiting examples of air separation system power reductions were calculated using a air separation system power consumption of 3.373 MW (in the absence of preheating).

In a first case, both the oxidant and fuel gas flows are preheated to 550° C. and the flue gas is cooled from 1,500° C. to 1,200° C. As a result, 10% of each of the oxidant and fuel gases is saved (in comparison to no preheating). Up to 2.000 MW of power is supplied to reduce a required 3.036 MW (3.373 MW−10%) needed by the air separation system, thereby resulting in a 66% reduction.

In a second case, only the fuel gas is preheated to 550° C. and the flue gas is cooled from 1,500° C. to 1,380° C. As a result, 4.7% of each of the oxidant and fuel gases is saved. Up to 2.550 MW of power is supplied to reduce a required 3.214 MW (3.373 MW −4.7%), thereby resulting in a 79% power reduction.

In a third case, only the fuel gas is preheated to 160° C. and the flue gas is cooled from 1,500° C. to 1,475° C. As a result, 1% of each of the oxidant and fuel gases is saved. Up to 2.850 MW of power is supplied to reduce a required 3.340 MW (3.373 MW−1%), thereby resulting in a 85% power reduction.

Also surprisingly, after cooling at heat exchanger systems 11, 31, 33, 35, 37 and 39, and boiler 19, the flow of flue gas 13 exiting the boiler 19 can have a temperature as low as 150° C. or 200° C. Such a low temperature, or even somewhat higher temperatures, allow the flow of flue gas 13 to be treated in a pollution abatement system without dilution by a colder fluid, such as air or water. Because of the much smaller mass flow rate of the flue gas (as compared to conventional flue gas dilution), the size of any pollution abatement system is much smaller. For example, based upon the reduction of the mass flow rate of the flue gas, the size of the pollution abatement system may be reduced by as much as 75% and consequently be much less expensive, both in terms of capital and operating costs.

The temperature of the flow of flue gas 13 leaving the boiler 19 is not restricted to the temperatures described above. For example, the temperature of the flow of flue gas 13 exiting the boiler 19 is preferably about 200° C. to about 400° C. More preferably, the flow of flue gas 13 exiting the boiler has a temperature of from about 200° C. to about 300° C.

Perhaps most unexpectedly, the present invention renders utilization of oxy-fired combustion much more economically beneficial than previously thought. A common belief in the art is that, in comparison to air-fired combustion requiring costly NOx reduction technologies, oxy-fired combustion still requires a larger capital expenditure for the ASU and associated equipment and relatively high operating costs associated with the ASU's power requirements. These beliefs have led many of those skilled in the combustion art to conclude that oxy-fired combustion is economically unsound. However, we have shown that this conclusion is erroneous. Because implementation of the invention results in one or more benefits (such as 10% savings in fuel gas, 10% savings in oxidant gas, decreased power requirement of the air separation system (or increased supply of power used elsewhere), and reduced size of the pollution abatement system), in comparison to an oxy-fired combustion system lacking these aspects of the invention, the invention will pay for itself in a relatively short amount of time.

This surprising result is greatly magnified when each of the components of the inventive heat recovery scheme are integrated into one system. Based upon the flue gas temperature and the costs of heat exchangers, ASU's, boilers, steam turbines, electrostatic precipitators, scrubbers, and associated equipment, we have unexpectedly found that the capital expenditure for implementation of the invention at an oxy-fired combustion system will pay for itself in less than 2 years. Furthermore, implementation of the inventive heat recovery scheme will thereafter reduce the system's operating costs by more than 20%. Thus, as a result of these aspects of the invention integrated into the same system, oxy-fired combustion becomes much more attractive than air-fired combustion.

It is understood that the present invention is not limited to the embodiments described above, but may be modified and encompasses any and all embodiments in the following claims.

We claim:

1. A system for recovering thermal energy produced by an oxygen-enriched combustion furnace in which oxidant and fuel gases are combusted thereby producing flue gas, said system comprising:
   a) a source of oxidant gas, said oxidant gas having a higher oxygen content than air;
   b) at least one heat exchanger system adapted to receive the flue gas and at least one of said oxidant gas and the fuel gas, such that the at least one of said oxidant gas and the fuel gas are heated and the flue gas is cooled;
   c) a waste heat boiler adapted to transfer heat from the flue gas to feedwater flowing therethrough to produce superheated steam;
   d) a turbine for expansion of the superheated steam therethrough and producing mechanical power therefrom.

2. The system of claim 1, wherein:
   a) the source of oxygen comprises an air separation unit.

3. The system of claim 1, further comprising
   a) a shaft operatively connecting said turbine and air separation unit thereby providing at least a portion of said mechanical power to said air separation unit.

4. The system of claim 3, wherein:
   a) at least about 50% of a power requirement of said air separation unit is provided by said turbine through said shaft.

5. The system of claim 1, wherein:
   a) at least about 66% of a power requirement of said air separation unit is provided by said turbine through said shaft.

6. The system of claim 1, wherein:
   a) at least about 79% of a power requirement of said air separation unit is provided by said turbine through said shaft.

7. The system of claim 1, wherein:
   a) at least about 85% of a power requirement of said air separation unit is provided by said turbine through said shaft.

8. The system of claim 1, wherein:
   a) said at least one heat exchanger system comprises,
      i) a first heat exchanger for receiving the flue gas and said oxidant gas, thereby heating said oxidant gas and cooling the flue gas, said first heat exchanger including an outlet for directing said heated oxidant gas to the furnace, and
      ii) a second heat exchanger for receiving the flue and fuel gases, thereby heating the fuel gas and cooling the flue gas, said second heat exchanger including an outlet for directing the heated fuel gas to the furnace.

9. The system of claim 8, wherein:
   a) the flue gas is first cooled by said heat exchangers and then further cooled by said boiler; and
   b) said boiler allows a flow of water and/or steam therethrough such that heat energy from the further cooled flue gas is transferred to the superheated steam at said boiler.

10. The system of claim 1, further comprising:
    a) a condenser for condensing steam discharged from said turbine; and
    b) a pump for pressurizing the water condensed at said condenser.

11. The system of claim 8, wherein:
    a) said heat exchangers are adapted to withstand temperatures such that temperatures of the fuel gas and said oxidant gas heated at said heat exchangers results in a decreased fuel requirement and a decreased oxidant requirement of the furnace, respectively, in comparison to the system of claim 8 when operated without heating said oxidant gas and the fuel gas at said heat exchangers.

12. The system of claim 1, wherein:
    a) said at least one heat exchanger system comprises a material that substantially resists corrosion under exposure to substantially pure oxygen at a temperature of 700° C.

13. The system of claim 1, wherein:
    a) said at least one heat exchanger system includes a heat exchanger having a coating for contact with said oxidant gas; and
    b) said coating substantially resists corrosion under exposure to substantially pure oxygen at a temperature of 700° C.

14. The system of claim 1, wherein:
    a) said at least one heat exchanger system comprises first and second heat exchangers;
    b) the flue gas and one of said oxidant gas and the fuel gas flows through said first heat exchanger in a same first direction; and
    c) the flue gas and the other of said oxidant gas and the fuel gas flows through said second heat exchanger in a same second direction.

15. The system of claim 8, wherein:
    a) said heat exchanger system and said boiler are adapted to cool the flue gas to a temperature of about 150° C. to about 400° C. as the flue gas exits said boiler.

16. The system of claim 15, wherein:
    a) said heat exchanger system and said boiler are adapted to cool the flue gas to a temperature of about 200° C. to about 300° C. as the flue gas exits said boiler.

17. The system of claim 1, wherein:
a) said at least one heat exchanger system includes
   i) a first heat exchanger adapted to transfer heat from the flow of flue gas to an intermediate heat transfer fluid, and
   ii) a second heat exchanger adapted to transfer heat from the intermediate heat transfer fluid to least one of said flow of oxidant gas and the flow of fuel gas.

18. The system of claim 3, wherein:
a) more than about 39% a power requirement of said air separation unit is provided by said turbine through said shaft.

19. The system of claim 8, wherein:
a) said heat exchangers and boiler are adapted such that a temperature of the flue gas exiting said boiler is less than about 400° C.; and
b) the temperature of the flue gas exiting said boiler is achieved without dilution of the flue gas by another gas having a temperature less than the temperature of the flue gas.

20. A method for increasing the energy efficiency of an oxygen-enriched combustion furnace, said method comprising the steps of:
a) providing oxidant gas and fuel gas, the oxidant gas having an oxygen content higher than air;
b) allowing at least one of the oxidant and fuel gases to flow through at least one heat exchanger system thereby heating at least one of the oxidant and fuel gases;
c) combusting the heated oxidant and fuel gases in the furnace thereby providing flue gas;
d) allowing the flue gas to flow through the at least one heat exchanger system thereby cooling the flue gas as the oxidant and fuel gases are heated;
e) allowing feedwater and the flue gas to flow through a waste heat boiler such that heat from the flue gas is transferred to the feedwater thereby producing superheated steam; and
f) allowing the superheated steam to be expanded through a turbine thereby producing mechanical power.

21. The method of claim 20, further comprising the step of:
a) providing air, wherein said step of providing a flow of oxidant gas is achieved by separating the air with an air separation unit into the oxidant gas and an oxygen-deficient gas, the oxygen-deficient gas having an oxygen content lower than the air.

22. The method of claim 20, further comprising the step of:
a) providing the mechanical power to the air separation unit.

23. The method of claim 20, further comprising the steps of:
a) selecting as the at least one heat exchanger system a first heat exchanger and a second heat exchanger;
b) allowing one of the oxidant and fuel gases to flow through the first heat exchanger;
c) allowing the other of the oxidant and fuel gases to flow through the second heat exchanger; and
d) allowing the flue gas to flow through the first and second heat exchangers thereby heating the oxidant and fuel gases and cooling the flue gas and heating oxidant and fuel gases.

24. The method of claim 20, further comprising:
a) heating at least one of the oxidant and fuel gases at the at least one heat exchanger to a temperature of from about 200° C. to about 800° C.

25. The method of claim 20, wherein:
a) the flow of flue gas from the furnace has a temperature of greater than about 1,250° C.

26. The method of claim 20, wherein:
a) the flow of flue gas is cooled by the at least one heat exchanger system such that the flow of flue gas entering the waste heat boiler has a temperature of from about 300° C. to about 1,500° C.

27. The method of claim 23, wherein:
a) each of the heat exchangers comprises a material that substantially resists corrosion under exposure to oxygen at a surface temperature of 700° C.

28. The method of claim 21, further comprising the step of:
a) transferring the mechanical power from the turbine to the air separation unit with a shaft thereby supplying at least about 50% of a power requirement of the air separation unit needed for separating the air into the oxidant and oxygen-deficient gases.

29. The method of claim 21, further comprising the step of:
a) transferring the mechanical power from the turbine to the air separation unit with a shaft thereby supplying at least about 66% of a power requirement of the air separation unit needed for separating the air into the oxidant and oxygen-deficient gases.

30. The method of claim 21, further comprising the step of:
a) transferring the mechanical power from the turbine to the air separation unit with a shaft thereby supplying at least about 79% and up to about 67% of a power requirement of the air separation unit needed for separating the air into the oxidant and oxygen-deficient gases.

31. The method of claim 21, further comprising the step of:
a) transferring the mechanical power from the turbine to the air separation unit with a shaft thereby supplying at least about 85% of a power requirement of the air separation unit needed for separating the air into the oxidant and oxygen-deficient gases.

32. The method of claim 21, further comprising the step of:
a) transferring the mechanical power from the turbine to the air separation unit with a shaft thereby supplying more than 50% of a power requirement of the air separation unit needed for separating the air into the oxidant and oxygen-deficient gases.

33. The method of claim 23, wherein heating of the oxidant and fuel gases decreases a fuel gas requirement and an oxidant gas requirement of the furnace, respectively, in comparison to when the method of claim 27 is operated without heating the oxidant and fuel gases at the heat exchangers.

34. The method of claim 20, wherein:
a) a temperature of the flue gas exiting said boiler is less than about 400° C.; and
b) the temperature of the flue gas exiting said boiler is achieved without dilution of the flue gas by another gas having a temperature less than the temperature of the flue gas.

35. A system for increasing the energy efficiency of an oxygen-enriched combustion furnace in which oxidant gas and fuel gas are combusted thereby producing a hot flue gas, said system comprising:
a) an air separation unit adapted to provide a flow of oxidant gas, said oxidant gas having a higher oxygen content than air, said air separation unit having a power requirement x needed for providing the flow of oxidant gas;
b) at least one heat exchanger system adapted to receive a flow of hot flue gas and at least one of said flow of oxidant gas and the flow of fuel gas, thereby heating at least one of said flow of oxidant gas and the flow fuel gas and cooling the hot flow of flue gas;
c) a waste heat boiler adapted to absorb heat energy from the cooled flow of flue gas and produce superheated steam and further cooling the cooled flow of flue gas;
d) a turbine adapted to allow expansion of the superheated steam therethrough thereby producing mechanical power therefrom; and
e) a shaft adapted to transfer the mechanical power from said turbine to said air separation unit, wherein said air separation unit, said at least one heat exchanger, said waste heat boiler, said turbine, and said shaft are adapted such that the mechanical power provides at least about 39% of said power requirement x.

36. A method for recovering energy from a combustion furnace that combusts oxygen-rich gas and fuel to gas to produce a hot flue gas, said method comprising the steps of:
a) separating a source of air with an air separation unit into oxygen-enriched gas and oxygen-deficient gas, the oxygen-rich gas having an oxygen content higher than the air; the oxygen-deficient gas having an oxygen content lower than the air;
b) providing a fuel gas;
c) providing first and second heat exchangers;
d) allowing one of the fuel gas and flue gas to flow through the first heat exchanger thereby providing heated fuel gas and cooled flue gas;
e) allowing the other of the oxygen-rich gas and cooled flue gas to flow through the second heat exchanger thereby heating the oxygen-rich gas and further cooling the cooled flue gas, the further cooled flue gas having a temperature lower than the cooled flue gas;
f) combusting the heated oxygen-rich gas and the heated fuel gas in the combustion furnace thereby providing the hot flue gas;
g) allowing the further cooled flue gas to flow through a waste heat boiler such that heat is absorbed from the further cooled flue gas to produce superheated steam;
h) allowing the superheated steam to be expanded through a turbine thereby producing mechanical power; and
j) transferring the mechanical power to the air separation unit thereby decreasing more than 50% of a power requirement of the air separation unit that is needed to separate the air.

* * * * *